United States Patent
Slemmer

(12) 
(10) Patent No.: US 6,240,533 B1
(45) Date of Patent: May 29, 2001

(54) METHOD AND APPARATUS FOR PROVIDING UNINTERRUPTED COMMUNICATION OVER A NETWORK LINK

(75) Inventor: Michael W. Slemmer, Sioux Falls, SD (US)

(73) Assignee: LodgeNet Entertainment Corporation, Sioux Falls, SD (US)

(*) Notice: Subject to any disclaimer, the term of this patent is extended or adjusted under 35 U.S.C. 154(b) by 0 days.

(21) Appl. No.: 09/258,028

(22) Filed: Feb. 25, 1999

(51) Int. Cl.[7] ............................. H02H 3/05; H04L 1/22
(52) U.S. Cl. ............................. 714/48; 713/201
(58) Field of Search ............................. 714/48, 47; 713/201; 709/220, 221, 224, 249

(56) References Cited

U.S. PATENT DOCUMENTS

| | | | |
|---|---|---|---|
| 5,287,461 | 2/1994 | Moore | 395/275 |
| 5,432,907 | 7/1995 | Picazo, Jr. et al. | 395/200 |
| 5,473,599 * | 12/1995 | Li et al. | 370/219 |
| 5,745,754 * | 4/1998 | Lagarde et al. | 707/104 |
| 5,778,174 | 7/1998 | Cain | 395/187.01 |
| 5,781,715 | 7/1998 | Sheu | 395/182.02 |
| 5,790,548 * | 8/1998 | Sistanizadeh et al. | 370/401 |
| 5,802,320 | 9/1998 | Baehr et al. | 395/200.79 |
| 5,867,667 * | 2/1999 | Butman et al. | 709/249 |
| 6,088,796 * | 7/2000 | Cianfrocca et al. | 713/152 |
| 6,134,591 * | 10/2000 | Nickles | 709/229 |
| 6,134,662 * | 10/2000 | Levy et al. | 713/200 |

* cited by examiner

Primary Examiner—Dieu-Minh T. Le
(74) Attorney, Agent, or Firm—Sheridan Ross P.C.

(57) ABSTRACT

A system for providing uninterrupted communication over a network link includes a multi-port switch that is connected to a first network portion and a second network portion that are communicating with one another. The multi-port switch is also connected to a separate server unit, such as a firewall computer. The switch is configured to direct communication signals flowing between the first network portion and the second network portion through the separate server unit for processing during normal operation. When the separate server unit fails, however, the switch is reconfigured so that communications bypass the separate server unit. In a preferred embodiment, a Ethernet switch having virtual local area network (VLAN) capability is used.

27 Claims, 4 Drawing Sheets

METHOD AND APPARATUS FOR PROVIDING UNINTERRUPTED COMMUNICATION OVER A NETWORK LINK

FIELD OF THE INVENTION

The invention relates generally to communication networks and, more specifically, to devices for ensuring uninterrupted service in a communication network.

BACKGROUND OF THE INVENTION

Communication networks generally comprise a number of communication nodes that are interconnected using some form of communication medium. For example, a local area network (LAN) is a communication network that includes a number of user terminals in a relatively localized area that are interconnected amongst each other by a network medium such as a twisted pair or coaxial cable. Communication networks can also be connected to other communication networks so that users of one connected network can communicate with users of another connected network. An example of this is the Internet which consists of a large number of individual networks that are connected to one another through a high capacity backbone medium. Individual communication networks can also be subdivided into a number of subnetworks that each consist of a subgroup of the total nodes in the network. For example, a large corporation having many different buildings may maintain a different subnetwork for each building. The subnetworks are then interconnected to form the corporate network. The individual subnetworks are often separately addressable entities that can be individually managed.

Oftentimes, it is desirable to insert a server or other type of network device within an individual link in the network so that all communications through that link pass through the server. An example of this would include the insertion of a firewall device within the connection path between two networks or subnetworks, such as between a private network and the Internet. A firewall device is essentially a filter that controls the type of information that can flow into or out of an individual network. For example, a corporation whose corporate network is connected to the Internet may install a firewall within the connection to prevent external entities from having access to the corporation's internal files. The corporation's firewall can also be used to control which extra-corporate resources the corporations employees will have access to.

A network server that is located within an individual link of a network can create a problem if the server fails during network operation. That is, the failure will generally sever the connection between the nodes on either side of the network link. If a firewall device fails, for example, the two networks attached thereto will no longer be able to communicate with one another. Many times, such network links are critical to an entity's business activities and must operate without interruption. For this reason, many businesses are reluctant to install servers within these critical links. Failure to install such servers (such as, for example, a firewall) may compromise network security, which can produce equal or greater harm to the entity.

Therefore, a need exists for a method and apparatus that allows uninterrupted service through a network link having a server, even if the server fails.

SUMMARY

The present invention relates to a method and apparatus for providing uninterrupted communication over a network link that includes in-line processing functionality, such as a firewall device. The system includes a switch that can be used to bypass the in-line processing functionality should the functionality fail. In one embodiment, backup functionality is provided to perform the in-line processing when a failure of the original processing functionality is detected. The system also includes a controller for monitoring the in-line processing functionality and for reconfiguring the switch when a failure is detected. The invention can be advantageously implemented, for example, to provide uninterrupted, secure access to a private communications network using a firewall device or similar apparatus.

In a preferred embodiment of the invention, the switch is an Ethernet switch having virtual local access network (VLAN) capabilities. VLAN capabilities allow port groups to be defined that control how external entities connected to the switch will be interconnected with one another. In addition, switching modes can generally be defined that each include a different combination of port groupings. In accordance with the present invention, the mode of the Ethernet switch is changed when a failure of an in-line processing unit has been detected. This mode change effectively bypasses the failed unit so that communications is substantially uninterrupted.

DETAILED DESCRIPTION

Figure 1:
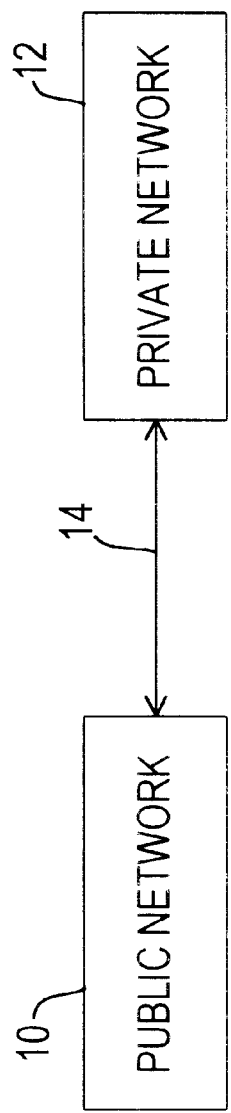
FIGS. 1 and 2 are block diagrams illustrating typical networking arrangements between a public network and a private network.

The present invention relates to a system for providing uninterrupted service through a network link having an in-line server. That is, even if the in-line server fails, communications over the network link are not severed. Thus, the system allows servers (such as firewall devices) to be used within critical network links without fear of losing the network link. The system includes a switching device that allows the server to be bypassed if and when a server failure occurs. In a preferred embodiment, the server bypass function is automatic and operates in substantially real time so that critical communications through the link are minimally affected. The system has particular application in networks utilizing Ethernet technology.

The principles of the present invention will be described in conjunction with an Internet firewall embodiment. It should be appreciated, however, that the principles of the present invention have application in any network configuration where a first network portion is connected to a second network portion by a network link that includes an in-line server through which communications must pass. For example, in one embodiment, the inventive principles are used to provide uninterrupted communication between two subnetworks within a single network that are interconnected via a connection device within the network. It should also be noted that the figures set forth herein generally use the same reference numerals to describe the same or similar functionality.

FIG. 1 is a block diagram illustrating a typical networking scenario wherein a private network 12 is connected to a public network 10 via an inter-network connection 14. The private network 12 can include, for example, a network within a corporation that allows employees of the corporation to communicate and share resources with one another. The public network 10 can include any network that can be accessed by the public, such as the Internet. The inter-network link 14 represents the communication path between the networks 10, 12 and can include, for example, a connection from the private network 12 to the Internet backbone. Such a connection can be direct or through an Internet Service Provider (ISP).

Figure 2:
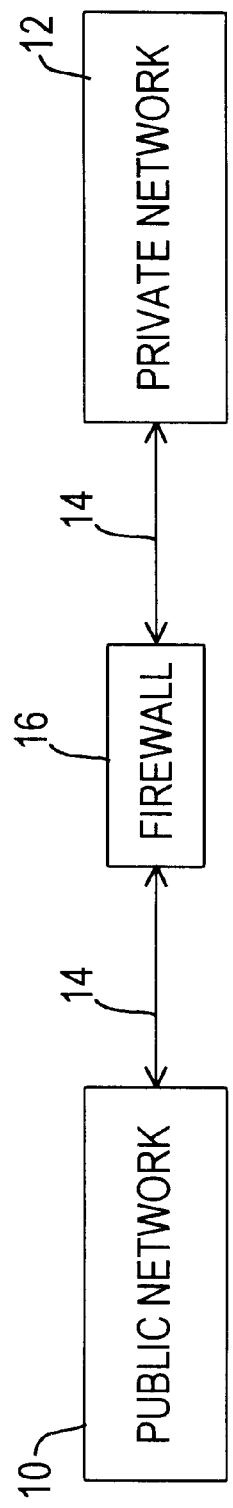

For security reasons, a manager of the private network 12 may decide that access to the private network 12 from the public network 10 is to be limited. In such cases, the manager will generally place a firewall device 16 somewhere within the inter-network link 14, as illustrated in FIG. 2. In general, a firewall device is a filter that only allows certain information to pass from an input port to an output port. All other information is generally discarded. Firewall devices can be implemented in software, hardware, or a combination of the two. Often, firewall devices are implemented using personal computers that are preprogrammed with the appropriate firewall routines. Firewall devices are generally placed "in-line" within a network link so that all communications on the link pass through the firewall device. As can be appreciated, this "in-line" configuration can create problems should the firewall device 16 fail. Most notably, such a failure could cut off all communications through the implementing network link.

Figure 3:
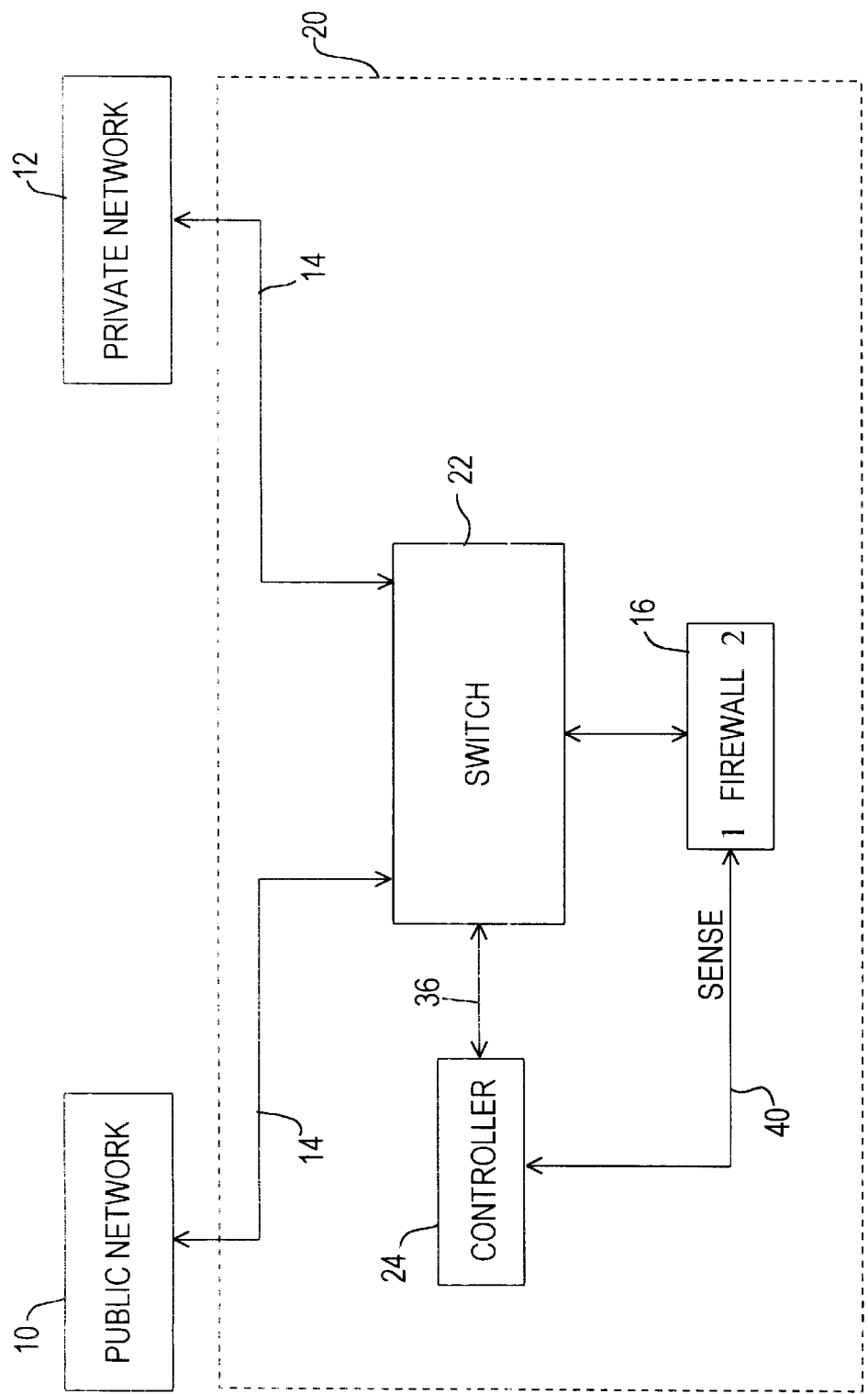
FIG. 3 is a block diagram illustrating a system in accordance with one embodiment of the present invention.

FIG. 3 is a block diagram illustrating a system 20 for providing an uninterrupted connection between two networks in accordance with one embodiment of the present invention. It should be appreciated that the blocks shown in FIG. 3 and other block diagrams herein are functional elements that do not necessarily correspond to discrete hardware elements. For example, two or more of the associated functions may be implemented in software within a single digital processor. As illustrated, the system 20 includes a switch 22, a controller 24, and a firewall device 16 and is interposed within a inter-network link 14 between a public network 10 and a private network 12. The system 20 is capable of providing an uninterrupted connection between the public network 10 and a private network 12, regardless of the condition of the firewall device 16. The switch 22 includes a number of input/output ports for receiving and transmitting signals. At least one of the ports is connected to the public network 10, at least one is connected to the private network 12, and at least one other port is connected to the firewall device 16. The controller 24 is coupled to the switch 22, via control line 36, for controlling the operation thereof. The controller 24 is also coupled to the firewall device 16, via sense line 40, for sensing a present operational condition of the firewall device 16.

During normal operation, the switch 22 is operative for directing all communications between the public network 10 and the private network 12 to the firewall device 16 for processing. If the firewall device 16 fails, however, the switch 22 provides a direct communication path between the two networks 10, 12 until the failure has been remedied. The controller 24 monitors the condition of the firewall device 16 and configures the switch 22 in accordance therewith. That is, during normal operation, the controller 24 sends information/instructions to the switch 22 that configures the switch to direct communications through the firewall device 16. When the controller 24 detects that the firewall device 16 has failed, it sends information/instructions to the switch 22 that reconfigures the switch 22 to enable a bypass of the firewall device 16. The controller 24 can then signal a network operator that the firewall device 16 needs to be repaired or replaced.

The controller 24 can include virtually any type of device that is capable of sensing a condition and generating an appropriate control signal in response thereto. In a preferred embodiment, the controller 24 is implemented within a digital processing device, such as a general purpose microprocessor or a digital signal processor. The controller 24 can be a separate unit from the switch 22 or it can be an integral part of a larger switch assembly. The controller 24 can sense a failure of the firewall device 16 in any of a number of different ways. For example, as shown in FIG. 3, a sense connection 40 can be provided between the controller 24 and the firewall device 16 that allows the controller 24 to directly monitor/measure one or more performance related characteristics of the firewall device 16. The controller 24 can then determine whether the firewall device 16 has failed based on these characteristics. Another method for determining whether a firewall failure has occurred involves monitoring the signals going into and out of the firewall device 16. The controller 24 can do this by monitoring, for example, the port(s) of the switch 22 that is coupled to the firewall device 16. If it is determined that nothing is being passed by the firewall device 16, it can be assumed that a failure has occurred. In one technique, the controller 24 performs a "test" on the firewall device 16 by sending a test signal into the device 16 via the switch 22. The test signal is one that should pass through the firewall device 16 in a known manner. For example, the test signal could be a packet that should pass through the firewall device 16 and emerge with a particular destination address in a header portion. If the signal does not pass through the firewall device 16 in the expected manner, the controller 24 can use this as evidence of a failure. As can be appreciated, many other methods for detecting firewall failures can also be used in accordance with the present invention. In a preferred approach, the controller 24 will only register failures that will result in a serious reduction in throughput through the firewall device 16. That is, less serious failures that only reduce throughput slightly will be ignored.

Figure 4:
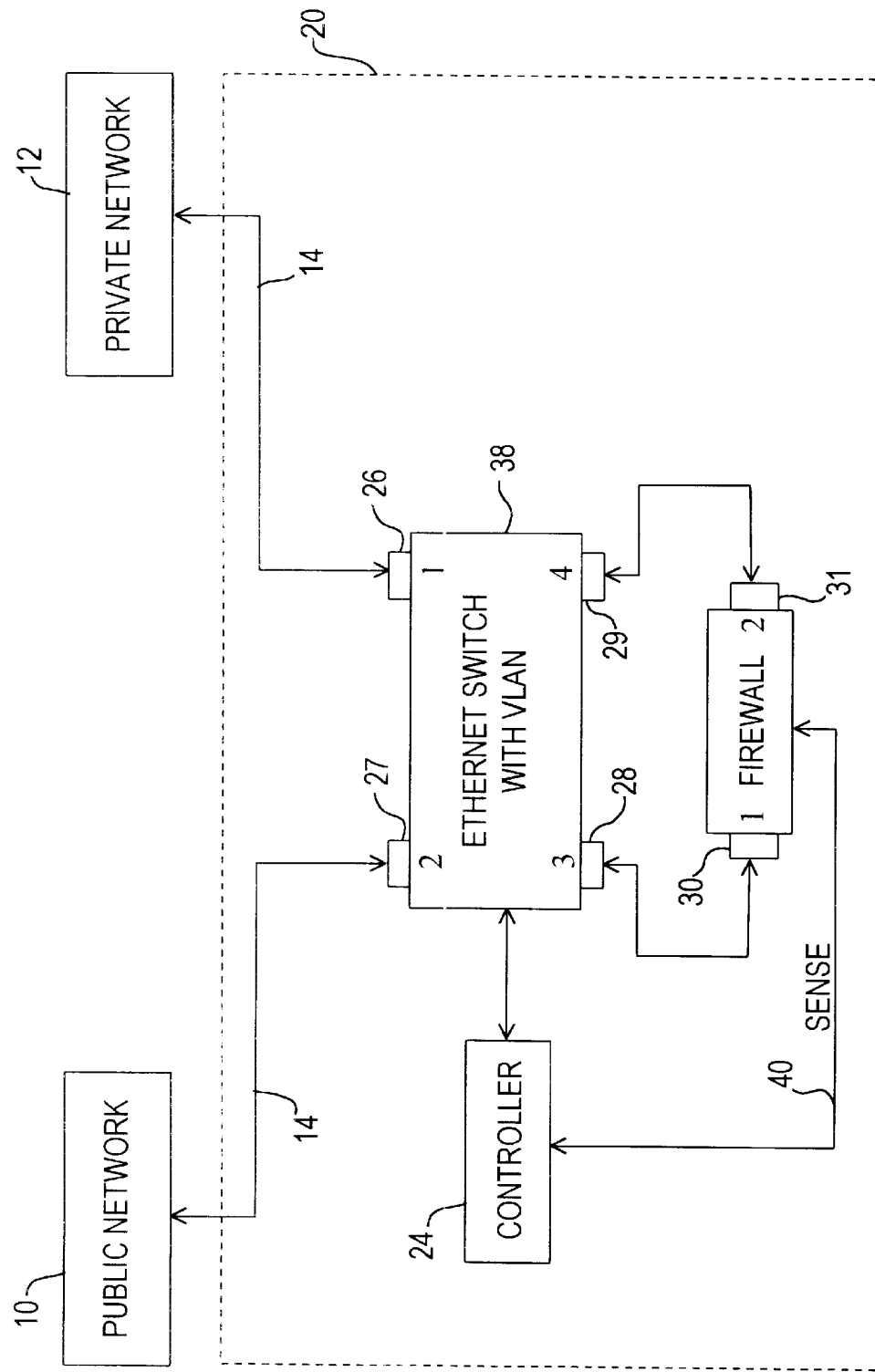
FIG. 4 is a block diagram illustrating a system in accordance with another embodiment of the present invention.

The switch 22 can include any form of switch that is capable of performing the requisite bypass in response to a control signal. The switch 22 can include either mechanical or electrical switching elements or the switching function can be implemented in software. In a preferred embodiment of the invention, as illustrated in FIG. 4, an Ethernet switch 38 having virtual local area network (VLAN) capability is used. The Ethernet switch 38 has a number of input/output ports 26–29 that are used to receive/transmit information from/to attached entities. In the illustrated embodiment, a first port 26 is connected to the private network 12, a second port 27 is connected to the public network 10, and a third and fourth port 28, 29 are connected to the firewall device 16. That is, the third port 28 of the switch 38 is connected to a first port 30 of the firewall device 16 and the fourth port 29 of the switch 38 is connected to a second port 31 of the firewall device 16.

The VLAN capability of the Ethernet switch 28, in general, allows a user to define a number of different VLAN groups for the Ethernet switch 38 that control how external entities connected to the Ethernet switch 38 are interconnected through the switch 38. Each of the VLAN groups corresponds to one or more of the available input/output ports of the switch 38, thus allowing all external entities connected to those ports to communicate with one another through the switch 38. If two ports are not associated with a common VLAN group, then the external entities attached to those ports will not be able to communicate with one another through the Ethernet switch 38 (although they may be able to communicate with one another via a connection outside the Ethernet switch 38). The Ethernet switch 38 will also preferably allow switching "modes" to be defined. Each of the switching modes will consist of a different arrangement of VLAN groups. The controller 24 can then change the current mode of the Ethernet switch 38 by delivering an appropriate control signal to the Ethernet switch 38 via control line 36.

In the preferred embodiment, a first switch mode is defined for use when the firewall device 16 is operating properly and a second switch mode is defined for use when the firewall device 16 has experienced a failure. In the first mode, a first VLAN group is defined that includes the second and third ports 27, 28 of the switch 38 and a second VLAN group is defined that includes the first and fourth ports 26, 29 of the switch 38. Thus, the public network 10 is linked to the first port 30 of the firewall device 16 and the private network 12 is connected to the second port 31 of the firewall device 16. Communications between the public network 10 and the private network 12 must therefore take place through the firewall device 16 which appropriately filters the communications. In the second mode, a third VLAN group is defined that includes the first port 26 and the second port 27 and a fourth VLAN group is defined that includes the fourth port 29. Thus, the public network 10 is given direct access to the private network 12 and the firewall device 16 is bypassed. It should be noted that the first and second VLAN groups will normally be deactivated when the second switch mode is enabled. It may be desirable to include the third port 28 of the Ethernet switch 38 within the third VLAN group so that users within the private network 12, for example, can monitor the condition of the firewall device 16 (e.g., determine when it is again operational). In a preferred embodiment, the controller 24 will simply indicate a mode number to the switch 38 to appropriately configure the switch 38 based on current conditions. In an alternate embodiment, the controller 24 must indicate to the switch 38 which of the switch ports are to be interconnected within each VLAN group at a particular point in time.

Figure 5:
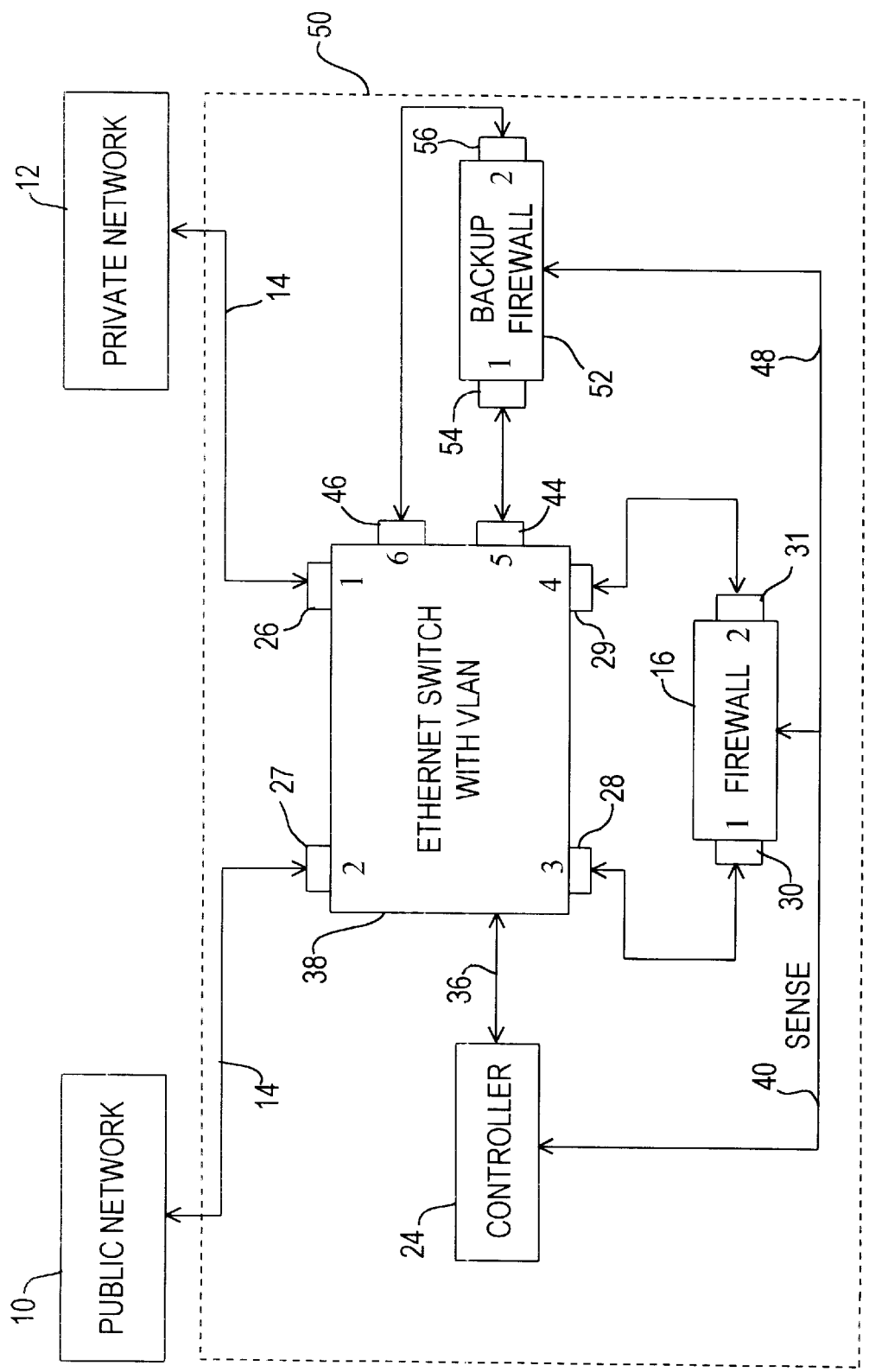
FIG. 5 is a block diagram illustrating a system in accordance with yet another embodiment of the present invention.

As can be appreciated, some private networks are not able to allow full public access to the network, even for a short period of time. For example, a corporation may maintain important business information on its network that it does not want to be accessible by its competitors. FIG. 5 is a block diagram illustrating a system 50 that is capable of providing uninterrupted, firewall-protected communication between two networks in accordance with one embodiment of the present invention. As illustrated, the system 50 is similar to the previously described embodiment with the addition of a backup firewall device 52 for use when the first firewall device 16 fails. The backup firewall device 52 includes a first port 54 that is connected to a fifth port 44 of the Ethernet switch 38 and a second port 56 that is connected to a sixth port 46 of the Ethernet switch 38. In addition, the backup firewall device 52 can also be connected to the controller 24 via a sense line 48. The backup firewall device 52 can be identical to the first firewall device 50 or, to reduce implementation costs, a less sophisticated device may be implemented.

With reference to FIG. 5, during normal operation, the controller 24 configures the Ethernet switch 38 to direct all communications between the public network 10 and the private network 12 through the firewall devise 16. When the controller 24 detects a failure of the firewall device 16, the controller 24 reconfigures the Ethernet switch 38 to all communications through the backup firewall device 52. A first mode can be defined that includes a first VLAN group comprising the second and third ports 27, 28 of the Ethernet switch 38 and a second VLAN group that includes the first and fourth ports 26, 29 of the switch 38. A second mode is defined that includes a third VLAN group comprising the second and fifth ports 27, 44 of the switch 38 and a fourth VLAN group that includes the first and sixth ports 26, 46 of the switch 38. When the controller 24 detects a failure of the first firewall device 16, it instructs the Ethernet switch 38 to change from the first switch mode to the second switch mode. The backup firewall device 52 then takes over the filtering function. When the first firewall device 16 has been repaired or replaced, the Ethernet switch 38 can be returned to the first switch mode. As can be appreciated, any number of backup firewall devices can be provided in accordance with the principles of the present invention.

Although the present invention has been described in conjunction with its preferred embodiments, it is to be understood that modifications and variations may be resorted to without departing from the spirit and scope of the invention as those skilled in the art readily understand. For example, as described previously, the principles of the invention can be used to ensure connectivity in any network situation that involves an in-line server device. This may include, for example, servers that are located between subnetworks in a single overall network. Such modifications and variations are considered to be within the purview and scope of the invention and the appended claims.

What is claimed is:

1. A system for use in providing uninterrupted communication between a first network portion and a second network portion, comprising:

firewall device which regulates user information between the first network portion and the second network portion, said firewall device receiving an input related to the user information and providing an output related to the user information;

a communications line associated with said firewall device that transmits firewall device operations-related information, different from said input and said output, including information related to at least a first type of failure when present associated with said firewall device, said firewall device operations-related information including at least one of the following: output-related information from said firewall device and performance characteristics associated with said firewall device; and a control subsystem, including a multi-port switch, operatively communicating with said communication line that responds to said firewall device operations-related information and uses said firewall device operations-related information to control said multi-port switch to be in at least one of a first state and a second state, wherein said multi-port switch is controlled to be in said first state when user information is communicated to said firewall device and a second state when user information is not communicated to said firewall device.

2. The system, as claimed in claim 1, wherein:

said firewall device operations-related information includes detection of said first type of failure associated with said firewall device by said control subsystem.

3. The system, as claimed in claim 1, wherein:

said control subsystem includes a controller having a monitor for monitoring said firewall device to determine whether said first type of failure has occurred within said firewall device.

4. The system, as claimed in claim 1, wherein:
said multi-port switch includes an Ethernet switch having virtual local access network (VLAN) functionality.

5. The system, as claimed in claim 1, wherein:
said control subsystem includes a digital processing unit.

6. The system, as claimed in claim 1, wherein:
said control subsystem includes a controller that is integrally associated with said multi-port switch.

7. The system, as claimed in claim 6, wherein:
said controller is located within a housing of said multi-port switch.

8. The system, as claimed in claim 1, further comprising:
a backup firewall device coupled to a port of said multi-port switch.

9. The system, as claimed in claim 8, wherein:
said control subsystem reconfigures said multi-port switch so that user information between the first network portion and the second network portion is input into said backup firewall device.

10. The system, as claimed in claim 1, wherein:
said control subsystem reconfigures said multi-port switch so that communications between the first network portion and the second network portion are transferred without processing within said system.

11. A system for use in providing uninterrupted communication between a first network portion and a second network portion, said system comprising:
   a switch having a plurality of ports, wherein a first of said plurality of ports is coupled to the first network portion and a second of said plurality of ports is coupled to the second network portion, said first port receiving an input related to user information to be transferred between the first and second network portions and said second port providing an output related to the user information, said switch permitting port groups to be defined that each includes a subset of said plurality of ports, wherein two external entities are only capable of directly communicating with each other through said switch if the two external entities are each connected to respective ports of said switch that are within a common port group, said switch having a first configuration comprising first and second port groups and a second configuration comprising a third port group, wherein said third port group is different from said first and second port groups;
   a server unit having a first server port and a second server port, said first server port being connected to a third of said plurality of ports and said second server port being connected to a fourth of said plurality of ports, wherein said server unit is operative for processing signals propagating between said first server port and said second server port;
   a communications line carrying at least one of the following of server unit related information that is different from said input and said output: server unit performance characteristics and server unit output-related information; and
   a controller, coupled to said switch, that receives said server unit related information and changes said switch from said first configuration to said second configuration when said server unit related information is indicative of at least a first type of failure associated with said firewall device.

12. The system, as claimed in claim 11, wherein:
said first port group includes said second port and said third port of said switch and said second port group includes said first port and said fourth port of said switch.

13. The system, as claimed in claim 12, wherein:
said third port group includes said first port and said second port of said switch.

14. The system, as claimed in claim 12, further comprising:
   a backup server unit having a third server port and a fourth server port, said third server port being connected to a fifth of said plurality of ports and said fourth server port being connected to a sixth of said plurality of ports, wherein said backup server unit is operative for processing signals propagating between said third server port and said fourth server port;
   wherein said third port group includes said second port and said fifth port of said switch, said second configuration further comprising a fourth port group including said first port and said sixth port of said switch.

15. The system, as claimed in claim 11, wherein:
said switch includes an Ethernet switch having virtual local area network (VLAN) capability.

16. The system, as claimed in claim 15, wherein:
each of said port groups comprises an individual VLAN grouping.

17. The system, as claimed in claim 11, wherein:
said controller determines said first type of failure of said server unit using said at least one of said server unit performance characteristics and said server unit output-related information.

18. The system, as claimed in claim 11, wherein:
said server unit includes a firewall machine for use in filtering signals flowing therethrough.

19. The system, as claimed in claim 11, wherein:
said controller is not accessible from at least one of said first network portion and said second network portion.

20. The system, as claimed in claim 11, wherein:
said third port group further comprises said third port of said switch.

21. A method for use in providing secure access to a first network portion from a second network portion, comprising:
   providing a firewall device in communication with the first network portion and the second network portion;
   providing a control subsystem in communication with said firewall device;
   controlling firstly user information between the first and second network portions using said firewall device;
   receiving by said control subsystem firewall device operations-related information that includes information related to at least one of: output-related information from said firewall device and performance characteristics associated with said firewall device; and
   controlling secondly user information between the first network portion and the second network portion independently of said firewall device after said firewall device operations-related information includes said information related to said at least one of output-related information from said firewall device and performance characteristics associated with said firewall device.

22. The method, as claimed in 21, wherein:
said control subsystem includes an Ethernet switch comprising a first port, a second port, a third port and a fourth port and having virtual local area network (VLAN) functionality, wherein said first port being connected to the first network portion, said second port being connected to the second network portion and said third port and said fourth port being connected to said firewall machine; and said step of controlling firstly includes enabling a first VLAN grouping and a second VLAN grouping, wherein said first VLAN grouping includes said second port and said third port and said second VLAN grouping includes said first port and said fourth port.

23. The method, as claimed in claim 22, wherein:

said step of controlling secondly includes enabling a third VLAN grouping including said first port and said second port of said Ethernet switch.

24. The method, as claimed in claim 23, wherein:

said third VLAN grouping includes at least one of said third port and said fourth port.

25. The method, as claimed in claim 21, further comprising:

providing a backup firewall device and said step of controlling secondly includes controlling communications flowing between the first and second network portions so that they are directed through said backup firewall device for processing.

26. A method, as claimed in claim 21, wherein:

said step of receiving includes sending said firewall device operations-related information using a sense line operatively associated with said firewall device.

27. A method, as claimed in claim 21, wherein:

said control subsystem includes a multi-port switch having at least first and second states and in which said step of controlling firstly includes having said multi-port switch in said first state and said step of controlling secondly includes having said multi-port switch in said second state.

* * * * *